US008571758B2

(12) United States Patent
Klier et al.

(10) Patent No.: US 8,571,758 B2
(45) Date of Patent: Oct. 29, 2013

(54) CONTINUOUS CORRECTION FOR STEERING WHEEL ANGLE OFFSET

(75) Inventors: Willy Klier, West Bloomfield, MI (US); David VanderLugt, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 98 days.

(21) Appl. No.: 13/271,303

(22) Filed: Oct. 12, 2011

(65) Prior Publication Data

US 2012/0095649 A1 Apr. 19, 2012

Related U.S. Application Data

(60) Provisional application No. 61/393,694, filed on Oct. 15, 2010.

(51) Int. Cl.
*B62D 12/00* (2006.01)
(52) U.S. Cl.
USPC .............. 701/41; 701/42; 701/43; 180/24.01; 180/197; 180/223; 180/247; 180/404; 33/203.14; 33/288; 303/146
(58) Field of Classification Search
USPC ............. 701/41, 42, 43; 180/24.01, 197, 223, 180/247, 404, 412, 414, 415, 422, 445; 33/203.14, 288; 303/146
See application file for complete search history.

(56) References Cited

U.S. PATENT DOCUMENTS

| 6,345,218 B1 | 2/2002 | Yamanaka et al. |
| 6,704,631 B2 | 3/2004 | Winner et al. |
| 6,775,604 B2 | 8/2004 | Dilger |
| 6,789,017 B2 | 9/2004 | Aanen et al. |
| 6,810,311 B2 | 10/2004 | Winner et al. |
| 6,895,357 B2 | 5/2005 | Lou et al. |
| 8,165,756 B2 * | 4/2012 | Yasui et al. ..................... 701/42 |
| 8,224,526 B2 * | 7/2012 | Miyajima et al. ............... 701/41 |
| 8,300,889 B2 * | 10/2012 | Jung ............................. 382/103 |
| 2003/0040856 A1 | 2/2003 | Winner et al. |
| 2008/0228353 A1 | 9/2008 | Mayfield et al. |

FOREIGN PATENT DOCUMENTS

| DE | 4102595 | 8/1991 |
| DE | 102007001965 | 7/2008 |
| DE | 102008026233 | 12/2009 |
| EP | 1388483 | 2/2004 |
| FR | 2920393 | 3/2009 |

(Continued)

OTHER PUBLICATIONS

PCT/US2011/055872 International Search Report and Written Opinion dated Feb. 7, 2012 (11 pages).

*Primary Examiner* — McDieunel Marc
(74) *Attorney, Agent, or Firm* — Michael Best & Friedrich LLP

(57) ABSTRACT

A system and method of continuously updating a steering wheel angle offset value to adapt to changing road conditions. A vehicle control system receives a plurality of vehicle parameter values each from a different vehicle sensor. The system then calculates a plurality of observed steering angle values, each using a different calculation method based on one or more of the plurality of vehicle parameter values. The plurality of observed steering angle values are then used to calculate a vehicle steering angle. A steering wheel angle offset value is then calculated based on the steering wheel angle and the calculated vehicle steering angle. The steering wheel angle offset value and the steering wheel angle are used to control the vehicle's steering system.

13 Claims, 3 Drawing Sheets

(56) References Cited

FOREIGN PATENT DOCUMENTS

| JP | 10119802 | 5/1998 |
|----|----------|--------|
| JP | 10119898 | 5/1998 |
| JP | 2008307910 | 12/2008 |
| JP | 2009113699 | 5/2009 |
| JP | 2010030503 | 2/2010 |
| WO | 2008055732 | 5/2008 |

* cited by examiner

US 8,571,758 B2

CONTINUOUS CORRECTION FOR STEERING WHEEL ANGLE OFFSET

CROSS-REFERENCE TO RELATED APPLICATIONS

This application claims priority to U.S. Provisional Patent Application No. 61/393,694 filed Oct. 15, 2010, the entire contents of which are hereby incorporated by reference.

BACKGROUND

The present invention relates to systems for correcting the steering wheel angle for a vehicle when operating on an uneven surface.

SUMMARY

When a vehicle is operating on an angled or sloped road surface, gravity can cause the vehicle to move to the left or to the right. As such, the vehicle may be unable to maintain travel in a straight direction even when the steering wheel of the vehicle is held at the center position. The invention provides, among other things, a method and system for calculating a steering wheel offset value during operation of the vehicle. As long as defined preliminary conditions are satisfied, the system continuously calculates updated steering wheel offset values to adapt to changing road surface conditions.

In one embodiment, the invention provides a method of continuously updating a steering wheel angle offset value to adapt to changing road conditions. A vehicle control system receives a plurality of vehicle parameter values each from a different vehicle sensor. The system then calculates a plurality of observed steering angle values, each using a different calculation method based on one or more of the plurality of vehicle parameter values. The plurality of observed steering angle values are then used to calculate a vehicle steering angle. A steering wheel angle offset value is then calculated based on the steering wheel angle and the calculated vehicle steering angle. The steering wheel angle offset value and the steering wheel angle are used to control the vehicle's steering system. In some embodiments, the method further includes comparing one or more of the vehicle parameter values to a corresponding vehicle condition threshold. The calculated steering wheel angle offset value is used to control the steering system only when each of the vehicle parameters satisfies the corresponding vehicle condition threshold.

In some embodiments, a rate of change of the steering wheel angle offset value is determined by comparing the steering wheel angle offset to one or more previous calculated steering wheel angle offset values. The vehicle system is then controlled based on the calculated steering wheel angle. In some embodiments, the steering wheel angle offset value is compared to a maximum steering wheel angle offset value and the vehicle steering system is operated based on the steering wheel angle offset only when the calculated steering wheel angle offset value is less than the maximum steering wheel angle offset value.

In another embodiment, the invention provides a method of continuously updating a steering wheel angle offset value to adapt to changing road conditions. A plurality of vehicle parameter values are each received from different vehicle sensors. An actual vehicle steering angle is calculated based on one or more of the vehicle parameter values. A steering wheel angle offset value is calculated based on the difference between the actual vehicle steering angle and the steering wheel angle. When the vehicle parameter values from the vehicle sensors satisfy one or more corresponding filter condition thresholds, the vehicle steering system is then operated based on the steering wheel angle and the steering wheel angle offset value only.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1A:
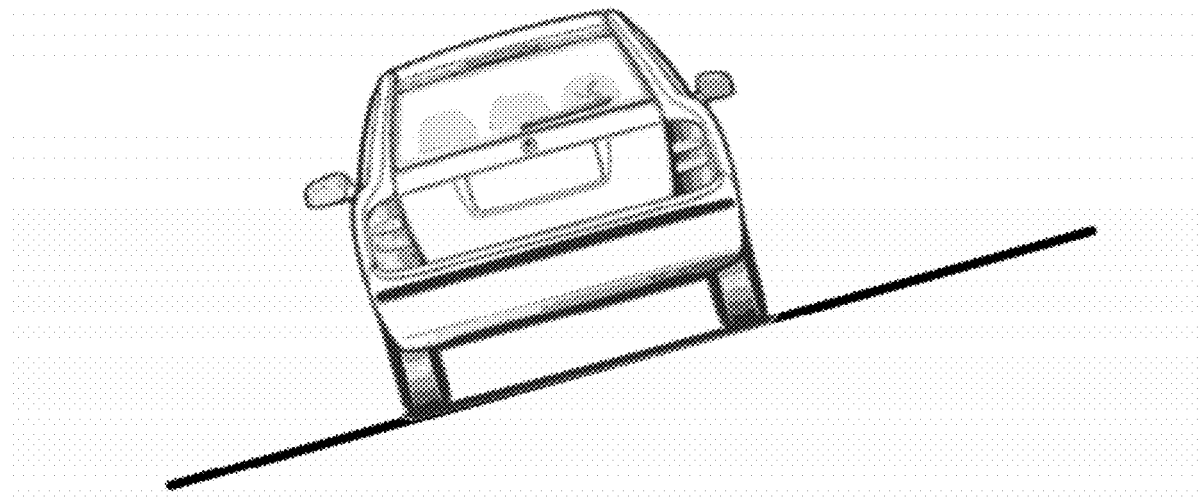
FIG. 1A is a view of a vehicle operating on an angled road surface.
Figure 1B:
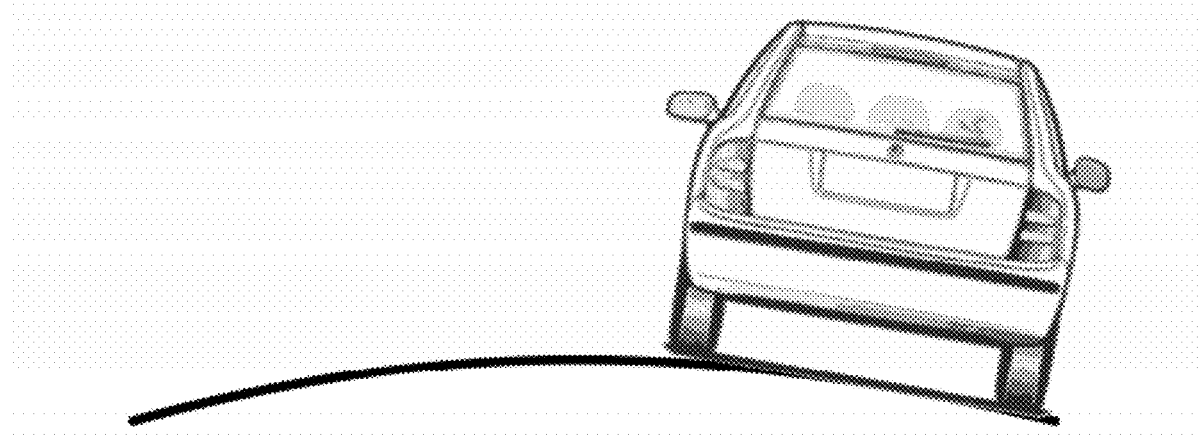
FIG. 1B is a view of a vehicle operating on a crowned road surface.

Road surfaces are often not level. The shape and angle of the road surface can impact the movement of a vehicle operating on the road surface. For example, FIG. 1A shows a road surface that is angled downward toward the left of a vehicle (or banked such that the right side wheels are higher than the left side wheels). The force of gravity will cause a vehicle operating on this angled surface to veer toward the left. As such, even when the steering wheel of the vehicle is held stationary in the center position, the vehicle may turn toward the left. Other road surface shapes can have similar effects on a vehicle. For example, the crowned road surface illustrated in FIG. 1B will cause the vehicle to veer toward the right.

Angled, crowned, or other non-level road surfaces can present a serious hazard to vehicle operators. A vehicle operating on the angled road of FIG. 1A may veer into oncoming traffic. Similarly, the vehicle operating on the crowned road surface of FIG. 1B could veer off the side of the road. Road surfaces with steeper angles or banking will have more significant effects on the steering angle of the vehicle.

Figure 2:
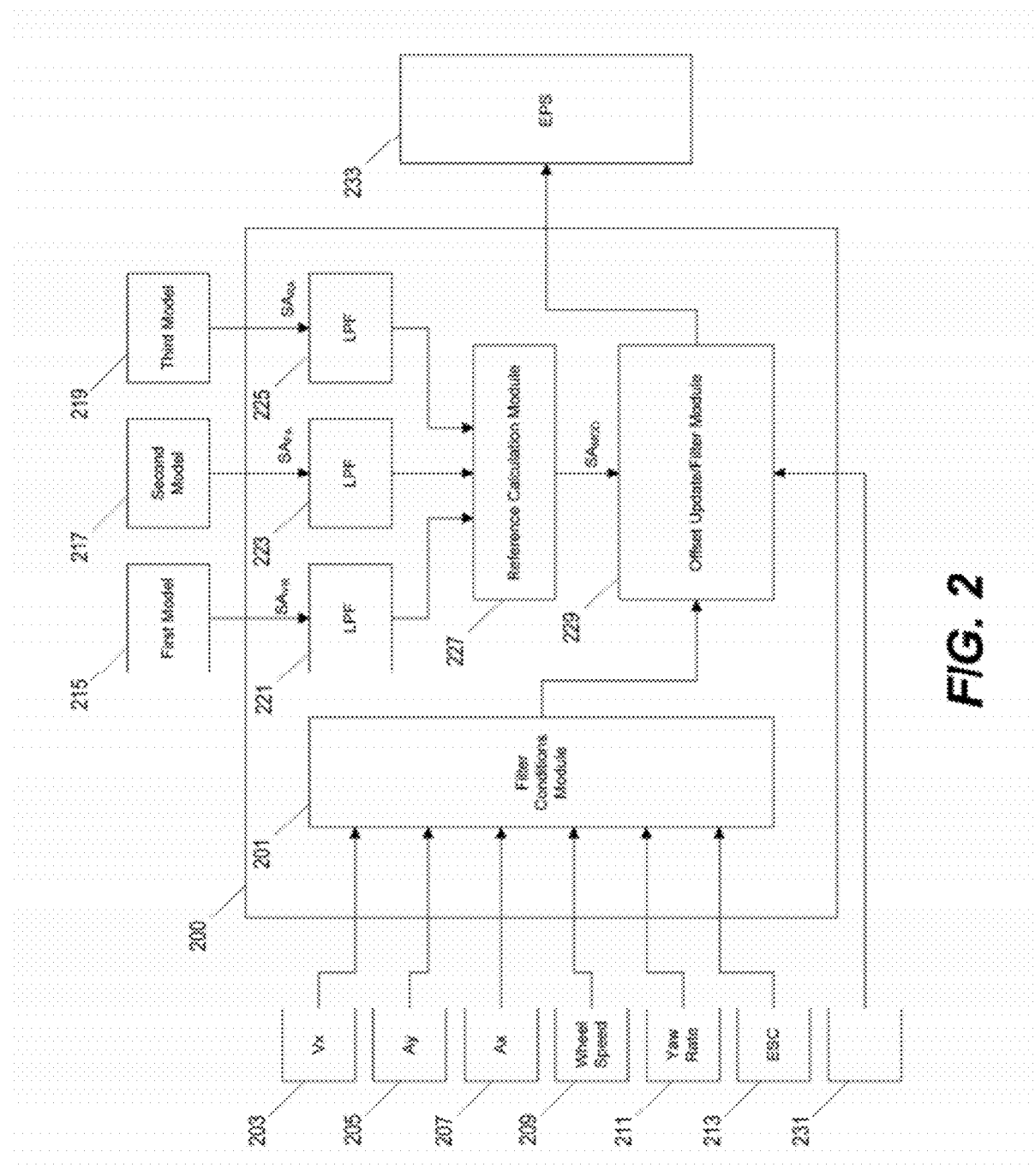
FIG. 2 is a schematic view of a continuous offset correction module according to one embodiment of the invention.

FIG. 2 illustrates a system for continuously generating a steering wheel offset angle for a vehicle. The steering wheel offset angle is added to the relative angle of the steering wheel to control how the vehicle wheels are turned. For example, if the road is angled downward to the left as illustrated in FIG. 1A, the calculated steering wheel offset adjusts for the shape of the road. When the steering wheel is held in the neutral center position, the calculated offset causes the vehicle steering system to turn the wheels of the vehicle to the right to compensate for the effects caused by operating on the angled road surface. By continuously updating the offset angle, the vehicle can adapt to changes in the shape and angle of the road surface. As such, the system adjusts the steering wheel angle so that the operator will not have to account for changes in road surface.

The system includes a continuation center find (CCF) module 200. The CCF module 200 is illustrated in FIG. 2 as a separate controller that receives various input values and generates an output. However, in other embodiments, the CCF module 200 can be implemented in other ways. For example, the CCF module 200 can be implemented as a subset of computer instructions (e.g., a subroutine) executed on a processor or controller that is part of another of a vehicle system and that also performs additional functions.

Although the CCF module 200 is implemented to continuously update a steering wheel angle offset value based on changing roadway conditions, it is not always desirable or safe to change the steering wheel angle offset value while the vehicle is being operated. For example, if the vehicle is experiencing a high level of acceleration (either laterally or longitudinally), it is possible that suddenly changing the steering wheel angle offset would make the vehicle difficult to operate. Accordingly, the CCF module 200 includes a filter conditions module 201. The filter conditions module 201 receives a set of input conditions and determines whether conditions are satisfied in which it would be desirable to adjust the steering wheel offset.

The conditions monitored and evaluated by the filter conditions module 201 may vary in specific embodiments. However, in the system illustrated in FIG. 2, the filter conditions module 201 receives vehicle parameter values indicative of the longitudinal velocity of the vehicle (Vx) as sensed by a velocity sensor 203, a later acceleration (Ay) from a lateral acceleration sensor 205, a longitudinal vehicle acceleration (Ax) from a longitudinal acceleration sensor 207, wheel speeds from one or more wheel speed sensors 209, and a yaw rate YR from a yaw rate sensor 211.

In the illustrated system of FIG. 2, the filter conditions module 201 also receives inputs from an electronic stability control system of the vehicle. Electronic stability control (ESC) systems are known and adjust the operation of one or more wheels of the vehicle in response to observed conditions (e.g., if the vehicle is slipping due to ice). The filter conditions module 201 as illustrated in FIG. 2, receives an input 213 from the ESC indicating whether the wheel speed signals have been compensated by the ESC.

The filter conditions module 201 evaluates the inputs and determines whether it is desirable to adjust the steering wheel angle offset. In the illustrated system, the filter conditions module 201 verifies that input values satisfy the requirements outlined in Table 1 below. However, the thresholds and the input variables evaluated by the filter conditions module 201 may vary depending upon the type of vehicle or the desired performance characteristics of the vehicle. As such, in other embodiments, the filter conditions module 201 may monitor other different variables and may compare the variables to different threshold criteria.

TABLE 1

| |Ay| | <0.5 m/s2 |
| |Ax| | <0.5 m/s2 |
| Vx | >30 kph |
| |Yr| | <2 deg/s |

In addition to monitoring performance criteria through the filter conditions module 201, the CCF module 200 also calculates an updated steering wheel offset angle based on observed operating conditions of the vehicle. The updated offset is determined by calculating a plurality of estimated effective vehicle steering angles using multiple different model-based calculations. Because different variables are evaluated and different techniques are used in each of the model-based calculations, the estimated effective vehicle steering angles from each model-based calculation will be slightly different. By using a plurality of methods to estimate the effective steering angle, the system is able to better approximate the actual steering angle of the vehicle.

In the system of FIG. 2, the first model 215 calculates an effective vehicle steering angle $SA_{YR}$ based on the observed yaw rate. The second model 217 calculates an effective vehicle steering angle $SA_{FA}$ based on the observed wheel speeds of the wheels on the front axle of the vehicle. The third model 219 calculates an effective vehicle steering angle $SA_{RA}$ based on the observed wheel speeds of the wheels on the rear axle of the vehicle. The values from each of the three model-based calculations are passed through a low-pass filter (221, 223, and 225, respectively).

The filtered outputs from each of the model-based calculations are then provided to a reference calculation module 227 to generate a weighted, model-based steer wheel angle $SA_{MOD}$. The reference calculation used by the reference calculation module 227 can be based on other observed conditions or outputs received from the ESC system of the vehicle. In the system of FIG. 2, the reference calculation is carried out using the following equation.

$$SA_{MOD} = \frac{k_{YR} * SA_{YR} + k_{FA} * SA_{FA} + k_{RA} * SA_{RA}}{k_{YR} + k_{FA} + k_{RA}}$$

The reference constants $k_{YR}$, $k_{FA}$, and $k_{RA}$ are determined based on outputs from the ESC. The front and rear axle constants ($k_{FA}$ and $k_{RA}$)) are determined based on whether both wheels on a given axle are stable and, if so, whether the wheel speed compensation exceeds a threshold percentage. If either wheel of the axle is not stable, the constant will be zero (0). If the axle is stable and the wheel speed compensation implemented by the ESC is less than 0.2%, the constant will be two (2). If the axle is stable and the wheel speed compensation is greater than 0.2%, but less than 0.5%, the constant for the axle will be one (1). The yaw rate constant ($k_{YR}$) is determined based on whether the ESC has compensated the yaw-rate is signal. If the yaw-rate signal is compensated by the ESC, the constant is four (4). If not, $k_{YR}$ is one (1).

The offset update/filter module 229 calculates a new updated steering wheel angle offset based on model-based vehicle steering angle. A raw offset value (OfsRaw(k)) is calculated by subtracting the model-based vehicle steering angle ($SA_{MOD}$) from the relative position of the steering wheel ($SA_{REL}$) as determined by a steering wheel angle sensor 231. The offset update/filter module 229 then determines the rate of change of the raw offset value (dOfsRaw(k)=OfsRaw(k)−OfsRaw(k−1)). The new steering wheel angle offset value (CCFOfs(k)) is calculated by adjusting the previous steering wheel angle offset value (CCFOfs(k−1)) based on the rate of change of the raw offset value according to the following equation.

CCFOfs(k)=CCFOfs(k−1)+FP*(dOfsRaw(k))

In order to ensure that the offset is adjusted gradually and no sudden changes are implemented that could effect driver's ability to control the vehicle, the rate of change of the raw offset is multiplied by a low-pass filter constant (FP). The filter constant (FP) is determined based on the rate at which the offset value is calculated and the amount of time that is required to complete the calculation operation. For example, in this embodiment, an updated raw offset value (OfsRaw) is calculated every 5 seconds and the calculation is completed within 20 ms. The filter constant (FP) for this embodiment is 0.004.

The offset update/filter module 229 provides a calculated steering wheel offset value to the electronic power steering (EPS) system 233. However, as an additional precaution, the offset update/filter module 229 performs a final filter to ensure that the steering wheel angle offset does not become too great and does not change suddenly. If the new calculated steering wheel offset is less than 10 degrees and the rate of change is less than 0.5 degrees/second, the new calculated offset value (CCFOfs(k)) is output to the EPS system 233 and used to control the steering of the vehicle. However, if the new calculated steering wheel offset is greater than 10 degrees or if the rate of change is greater than 0.5 degrees/second, the previous calculated offset value (CCFOfs (k−1)) is output to the EPS system 233 instead.

In other embodiments, the angle threshold and the rate of change threshold can be different based on the type of vehicle or desired operating conditions. Furthermore, in some embodiments, the value of the offset angle and the rate of change are capped at certain threshold values. For example, if the new calculated offset angle is greater than 10 degrees, the offset value sent to the EPS system 233 will be equal to 10 degrees. If the new calculated offset angle would cause the rate of change to exceed 0.5 degrees/second, the offset/update filter module 229 recalculates an offset value so that the rate of change is equal to 0.5 degrees/second. The recalculated offset value is output (or sent) to the EPS system 233.

Figure 3:
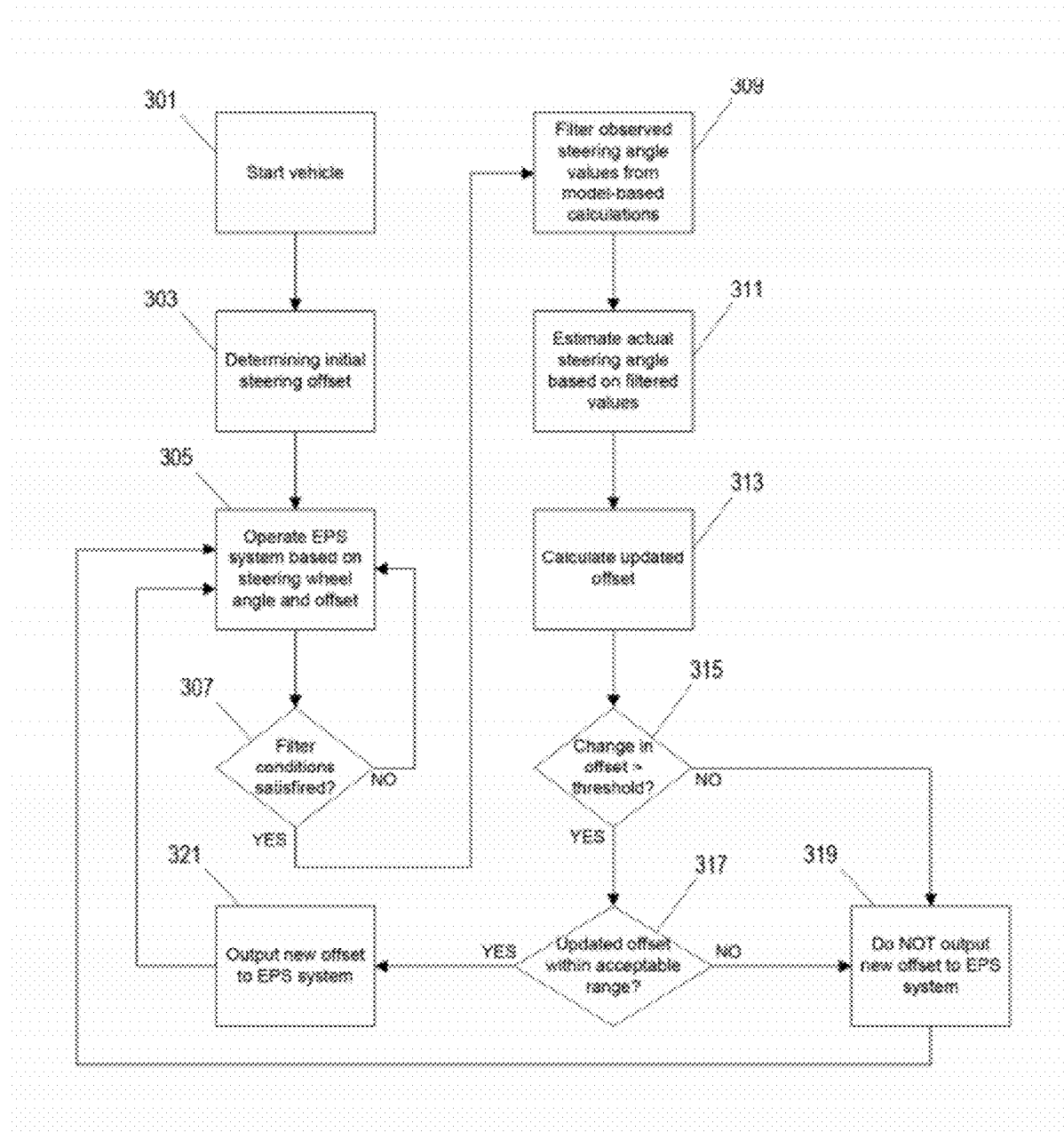
FIG. 3 is a flow chart illustrating a method of continuously calculating a steering wheel offset value for a vehicle.

FIG. 3 illustrates a method of using the system illustrated in FIG. 2 and described above to control the steering of a vehicle. After the engine of the vehicle is started (step 301), the vehicle's control system calculates an initial steering offset value (step 303) based on conditions sensed while the vehicle is stationary. The EPS system of the vehicle is then operated based on the initial steering offset value (step 305). The filter conditions module 201 then evaluates the values received from the sensors to determine if the filter conditions are satisfied (step 307). If not, the steering offset value is not changed and the EPS system continues to operate using the previous calculated steering offset value (step 305). However, if the filter conditions are satisfied, the system proceeds to determine a new steering offset value.

The observed steering angle values determined by a plurality of model-based calculations are filtered (step 309) and a reference calculation is used to estimate an actual vehicle steering angle (step 311). The offset update/filter module 229 then determines whether the change in offset is greater than a threshold (step 315) and if the updated offset is within a predefined range (step 317). If the offset angle or the rate of change exceeds the respective threshold, the calculated offset value is not output to the EPS 233 (step 319) and the vehicle continues to operate using the previous calculated offset value (step 305). However, when the offset angle and the rate of change are both within the respective thresholds, the new calculated offset is output to the EPS 233 (step 321). The system repeats steps 307-321 at regular intervals (e.g., every 5 seconds) to continuously update the steering wheel angle offset value.

The system and method described above are exemplary. As such, the invention may be practiced using other systems and methods. For example, according to the method illustrated in FIG. 3, a new offset is calculated only when the filter conditions are satisfied. However, in other embodiments, the offset update/filter module 299 and the filter conditions module 201 operate concurrently. In such a system, the newly calculated offset value is only output to the EPS system 233 when the filter conditions module 201 determines that the filter conditions have been satisfied. Similarly, in some embodiments, the acts performed by the modules illustrated in FIG. 2 can be performed by other modules. For example, in other embodiments, the final filter operations performed by the offset update/filter module 229 in the system of FIG. 2 (e.g., FIG. 3, steps 315 and 317) may be performed by the filter conditions module 201.

Additionally, in other embodiments, the system may receive different input values from different sensors in order to perform the filter or offset calculation operations. Similarly, although the system described in FIG. 2 receives inputs from an ESC system, other embodiments of the invention work independent of the vehicle ESC system and can be implemented in vehicles without an ESC system.

Thus, the invention provides, among other things, a system for continuously calculating a steering wheel offset value to enable the steering system of a vehicle to adapt to changing road conditions. Various features and advantages of the invention are set forth in the following claims.

What is claimed is:

1. A device for continuously updating a steering wheel angle offset value of a vehicle steering system to adapt to changing road conditions, the device comprising one or more processors, the one or more processors configured to
   receive a plurality of vehicle parameter values, each from a different vehicle sensor;
   calculate a plurality of observed steering angle values, each using a different calculation method based on one or more of the plurality of vehicle parameter values;
   calculate a vehicle steering angle based on the plurality of observed steering angle values;
   calculate a steering wheel angle offset value based on the difference between a steering wheel angle and the calculated vehicle steering angle;
   generate a command signal to control a vehicle steering system based on the steering wheel angle and the calculated steering wheel angle offset value; and
   repeatedly calculate subsequent steering wheel angle offset values based on subsequent pluralities of observed steering angle values throughout continuous operation of the vehicle.

2. The device of claim 1, where the one or more processors are further configured to
   compare one or more of the plurality of vehicle parameter values each to a corresponding vehicle condition threshold; and
   generate the command signal to control the vehicle steering system based on the steering wheel angle and the calculated steering wheel angle offset only when the one or more of the plurality of vehicle parameter values each satisfies the corresponding vehicle condition threshold.

3. The device of claim 2, wherein the one or more plurality of vehicle parameter values includes a vehicle speed value and the corresponding vehicle condition threshold includes a vehicle speed threshold, and wherein the one or more processors generate the command signal only when the vehicle speed is less than a vehicle speed threshold.

4. The device of claim 1, where the one or more processors are further configured to
   compare the calculated steering wheel angle offset value to one or more previous calculated steering wheel angle offset values; and
   control the vehicle steering system based on the steering wheel angle and the calculated steering wheel angle offset value only when a rate of change of the steering wheel angle offset value is less than a threshold.

5. The device of claim 1, where the one or more processors are further configured to
   compare the calculated steering wheel angle offset value to a maximum steering wheel angle offset value; and control the vehicle steering system based on the steering wheel angle and the calculated steering wheel angle offset value only when the calculated steering wheel angle offset value is less than the maximum steering wheel angle offset value.

6. The device of claim 5, where the one or more processors are further configured to control the vehicle steering system based on the steering wheel angle and the maximum steering wheel angle offset value when the calculated steering wheel angle offset value is greater than the maximum steering wheel angle offset value.

7. The device of claim 5, where the one or more processors are further configured to control the vehicle steering system based on the steering wheel angle and a previous calculated steering wheel angle offset value when the calculated steering wheel angle offset value is greater than the maximum steering wheel angle offset value.

8. The device of claim 1, where the one or more processors calculates the plurality of observed steering angle values by calculating each observed steering angle value using a different model-based calculation focusing on a different observed vehicle parameter.

9. The device of claim 8, wherein the model-based calculations used to calculate the plurality of observed steering angle values includes
- a yaw-rate model-based calculation that determines an observed steering angle value based on a yaw-rate detected by a yaw-rate sensor,
- a front-axle model-based calculation that determines an observed steering angle value based on a left front wheel speed detected by a left front wheel speed sensor and a right front wheel speed detected by a right front wheel speed sensor, and
- a rear-axle model-based calculation that determines an observed steering angle value based on a left rear wheel speed detected by a left rear wheel speed sensor and a right rear wheel speed detected by a right rear wheel speed sensor.

10. The device of claim 9, where the one or more processors calculate the vehicle steering angle based on the plurality of observed steering angle values includes calculating the vehicle steering angle using a reference calculation, wherein the reference calculation provides a different weighting to an observed steering angle value calculated using one of the model-based calculations based on one or more observed vehicle conditions.

11. The device of claim 9, wherein the reference calculation provides no weight to the observed steering angle value determined using the front-axle model-based calculation if the wheels of the front axle are not stable.

12. The device of claim 9, wherein the reference calculation provides no weight to the observed steering angle value determined using the rear-axle model-based calculation if the wheels of the rear axle are not stable.

13. A method of continuously updating a steering wheel angle offset value to adapt to changing road conditions, the method comprising:
- receiving a plurality of vehicle parameter values, each from a different vehicle sensor;
- calculating, by a processor, an actual vehicle steering angle based on one or more of the vehicle parameter values;
- calculating, by the processor, a steering wheel angle offset value based on the difference between the actual vehicle steering angle and a steer wheel angle detected by a steer wheel angle sensor;
- comparing, by the processor, a second one or more of the vehicle parameter values to one or more filter condition thresholds each corresponding to one of the vehicle parameter values;
- controlling a vehicle steering system based on the steering wheel angle and the calculated steering wheel angle offset value only when each of the second one or more vehicle parameter values satisfies the corresponding filter condition threshold; and
- repeatedly calculating subsequent steering wheel angle offset values based on subsequent pluralities of observed steering angle values throughout continuous operation of the vehicle.

* * * * *